3,376,361
FORMALDEHYDE BLOCK COPOLYMERS
George W. Halek, New Providence, Frank M. Berardinelli, South Orange, and Charles M. Hendry, Berkeley Heights, N.J., assignors to Celanese Corporation, a corporation of Delaware
No Drawing. Filed June 24, 1963, Ser. No. 290,157
11 Claims. (Cl. 260—823)

This invention relates to the copolymerization of formaldehyde to produce stable polymers having successively recurring oxymethylene groups interspersed with divalent comonomeric groups having adjacent carbon atoms.

It is known that oxymethylene polymers having successively recurring oxymethylene units are useful in the production of molded and extruded objects. Such polymers have excellent physical properties and produce strong molded objects. It is known that the thermal stability of oxymethylene polymers may be enhanced by the incorporation into the polymer molecule of interspersed comonomeric units having adjacent carbon atoms. It is desirable to incorporate such comonomeric units in controlled amounts since excessive proportions of interspersed comonomeric units impair the physical properties of the polymers while insufficient amounts of the comonomeric units fail to provide the required thermal stability.

The amount of comonomer to be incorporated into an oxymethylene polymer for optimum enhancement of thermal stability without impairment of physical properties will vary depending upon the particular comonomer used and depending upon the properties desired in the copolymer. For copolymers having oxymethylene groups interspersed with groups derived from a cyclic ether, such as the copolymers described in U.S. Patent No. 3,027,352 of Walling, Brown and Bartz, the proportion of comonomer units generally varies from about 0.1 to about 15 percent of the total monomeric units. The preferred copolymers contain from about 0.1 to about 5 percent of comonomer units.

In said U.S. Patent No. 3,027,352 stable copolymers having successively recurring oxymethylene groups are prepared by copolymerizing trioxane with a cyclic ether. In accordance with the present invention stable copolymers are prepared by copolymerizing formaldehyde with a cyclic ether or with other comonomers having adjacent carbon atoms, as explained more fully hereinbelow.

The copolymerization of formaldehyde with comonomers having adjacent carbon atoms presents problems which the copolymerization of trioxane does not present. It has been found that while it is relatively easy to produce copolymers of formaldehyde having relatively high proportions of comonomeric units incorporated therein, it is exceedingly difficult to prepare copolymers having the low desired proportions of comonomeric units which provide stability while at the same time do not impair the physical properties of the homopolymer.

It has been proposed to copolymerize formaldehyde with other monomers in a liquid medium wherein formaldehyde and the desired comonomers are continuously introduced in admixture. In such polymerization systems it has been found that when the admixture contains a relatively high proportion of comonomer the copolymerization proceeds satisfactorily but produces a copolymer containing an excessive amount of comonomeric units for optimum physical properties. On the other hand, when the admixture contains a relatively low proportion of comonomer the polymerization process produces formaldehyde homopolymer while the comonomer either remains unreacted or reacts only with itself to produce a second homopolymer in admixture with the formaldehyde homopolymer.

It has also been proposed to copolymerize formaldehyde with another monomer by feeding formaldehyde into a reaction zone which already contains, dissolved in an inert solvent, all of the comonomer to be reacted. In such polymerization systems it is possible to control the total amount of comonomer in the copolymer product but the distribution of comonomer is unsatisfactory. It appears that the initial polymerization takes place in a reaction zone containing excessive concentrations of comonomer so that the comonomer combines with itself to produce the comonomer chain segments within the molecule thereby providing poor distribution of comonomer units in the final polymer.

In accordance with the present invention there is provided a method of producing a stable polymer having successively recurring oxymethylene groups interspersed with divalent comonomeric groups having adjacent carbon atoms which comprises passing a mixture of formaldehyde and a comonomer into a reaction zone in the presence of an inert liquid solvent and a cationic catalyst, said comonomer having adjacent carbon atoms and being capable of copolymerization with formaldehyde in the presence of said cationic catalyst and said mixture containing from about 0.25 to about 2.0 mols of comonomer per mol of formaldehyde, reacting said mixture in said reaction zone to produce a prepolymer and thereafter reacting said prepolymer with additional formaldehyde to produce a polymer of high molecular weight (above 1000, preferably between 5000 and $10^6$).

The nature of the comonomer per se does not constitute a portion of this invention. Any material which is known to be copolymerizable with formaldehyde in cationic polymerization and which contains adjacent carbon atoms may be used in accordance with this invention.

In a particularly preferred embodiment of our invention the polymeric compounds to be created are oxymethylene copolymers having at least one chain containing recurring oxymethylene units interspersed with —OR— groups in the main polymer chain, where R is a divalent radical containing at least two carbon atoms directly linked to each other and positioned in the polymer chain between the two valences, with any substituents on said R radical being inert, that is those which are free of interfering functional groups and will not induce undesirable reactions. Particularly preferred are copolymers which contain from 85 to 99.6 mol percent of recurring oxymethylene groups. In a preferred embodiment R may be, for example, an alkylene or substituted alkylene group containing at least two carbon atoms.

Among the copolymers which may be made in accordance with this invention are those having a structure comprising recurring units having the formula

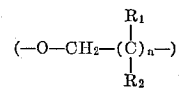

wherein $n$ is an integer from zero to 5 and wherein $n$ is zero in from 85 to 99.6 percent of the recurring units. $R_1$ and $R_2$ are inert substituents, that is, substituents which are free of interfering functional groups and will not induce undesirable reactions.

A preferred class of copolymers are those having a structure comprising oxymethylene and oxyethylene recurring units wherein from 85 to 99.6 percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing trioxane with a cyclic ether having the structure

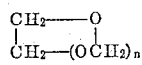

where $n$ is an integer from zero to 2.

The comonomers disclosed in said U.S. Patent No. 3,027,352 for copolymerization with trioxane, and particularly ethylene oxide and 1,3-dioxolane are particularly desirable. Other cyclic ethers disclosed in said U.S. Patent No. 3,027,352 may also be used, including trimethylene oxide; tetramethylene oxide; pantamethylene oxide; 1,2-butylene oxide; 1,3-butylene oxide and 2,2-di(chloromethyl) 1,3-propylene oxide. In addition to such cyclic ethers, other oxacyclic compounds having adjacent carbon atoms in the ring may be used including cyclic acetals and lactones, for example, cyclic ethylene glycol formal, beta propiolactone, gamma butyrolactone, cyclic ethylene glycol carbonate and cyclic adipic anhydride are included among the suitable comonomers.

Other classes of comonomers include compounds with ethylenic unsaturation which are polymerizable in cationic systems including isobutylene, styrene, vinyl ethers, vinyl acetate, vinyl methyl ketone and acrolein. Still other classes of comonomers include vinyl nitrogen compounds such as N-vinyl amines and N-vinyl amides such as N-vinyl-alphapyrrolidone, N-vinyl-para-tolyl-N-vinylcarbazole, N-vinalkyl-formamides, N-vinyl N-cyclohexylacetamide, N-vinylsuccinamide, N-vinylphthalamide, N-vinylpiperidine, vinyldiphenylamide, vinyldibutylamine, N-vinylindole, and N-vinyl-beta-propionolactam.

As used in the specification and claims of the subject application, the term "oxymethylene" includes substituted oxymethylene, where the substituents are inert with respect to the reaction in question, that is, the substituents are free of interfering functional groups and will not induce undesirable reactions.

The cationic catalysts which may be used in accordance with this invention include strongly acidic materials and particularly acidic metal halides including the halides of boron, iron, aluminum, tin, antimony, titanium, mercury, zinc and other metals.

Among the suitable catalysts are inorganic fluorides such as antimony trifluoride, antimony fluoborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride, and fluosulfonic acid.

Other suitable catalysts include alkane sulfonic acids, preferably lower alkane sulfonic acids having not more than 5 carbon atoms, such as ethane sulfonic acid, propane sulfonic acid, butane sulfonic acid, etc. Other suitable catalysts include thionyl chloride, phosphorus trichloride, stannic chloride, titanium tetrachloride and zirconium chloride.

The preferred catalysts are boron trifluoride and its organic complexes. Boron fluoride complexes with ethers such as boron fluoride diethyl etherate and boron fluoride dibutyl etherate are the preferred catalysts. The nature of the polymerization catalyst per se does not constitute a portion of this invention.

The proportion of catalyst used in the polymerization may vary considerably depending upon the nature of the catalyst, the temperature of the reaction, the nature of the comonomer, and the amount of inert diluent. Generally, between about 0.0025 and about 1.0 wt. percent of catalyst based upon total monomers is suitable. For oxacyclic comonomers and boron trifluoride catalysts or boron trifluoride complex catalysts, the preferred proportions are between about 0.01 and about 0.1 wt. percent based on total weight of monomer.

The inert solvents which may be used in accordance with this invention include hydrocarbons and particularly aliphatic, cycloaliphatic and aromatic hydrocarbons; halogenated hydrocarbons, and other inert liquids which are solvents for formaldehyde and for the comonomer. Specific suitable solvents include N-heptane, toluene, cyclohexane, methyl chloride and ethylene dichloride. The nature of the inert solvents per se does not constitute a portion of this invention. The preferred inert solvent is cyclohexane.

The temperature of the reaction may vary from a minimum of about 0° C. to a maximum of about 100° C. In the copolymerization of formaldehyde with a cyclic ether such as ethylene oxide or 1,3-dioxolene, the preferred temperature is from about 25° C. to about 70° C.

The mol ratio of comonomer to formaldehyde may vary depending upon the nature of the comonomer. For cyclic ethers such as ethylene oxide it is preferred that the mol ratio of comonomer to formaldehyde during the initial reaction to produce prepolymer be between about 1 to 4 and about 2 to 1. The most preferred ratio during the initial polymerization period when ethylene oxide is the comonomer is about 1 mol of ethylene oxide to 2 mols of formaldehyde.

It has been found in accordance with this invention that copolymers made in accordance with the method of this invention have not only higher thermal stability than homopolymers and higher thermal stability than copolymers made from formaldehyde and the same comonomers by other procedures, but also substantially higher stability against alkaline hydrolysis. Stability against alkaline hydrolysis is a useful measure of the degree of dispersion of the comonomer units in the polymer chain. It has been found that when comonomer units are dispersed throughout the polymer chain the polymer is stable against alkaline hydrolysis. It is believed that under alkaline hydrolysis conditions oxymethylene units at the ends of the copolymer chain degrade until a comonomer unit with adjacent carbon atoms is reached and becomes the terminal unit of the chain. Comonomer units having adjacent carbon atoms are stable to further degradation under alkaline hydrolysis conditions and terminate the degradation process at the end of the polymer chain when such units become terminal units. Distribution of the comonomer units throughout the polymer chain assures the reaching of a stable comonomer unit before substantially complete degradation of the chain takes place.

Stability to alkaline hydrolysis is determined by measuring the weight loss of polymer when dissolved in a 10% solution in 50/50 dimethyl formamide-benzyl alcohol containing 1 gram of tributylamine per 100 grams of polymer at a temperature of 160° C. for a period of one hour.

In carrying out the reaction of the present invention by a batch procedure in a single reaction vessel, the vessel is first charged with inert solvent and the cationic catalyst. A mixture of formaldehyde and comonomer in the desired proportion is then charged to the reaction vessel and mixed with the inert solvent and catalyst. When the comonomer is a gaseous material such as ethylene oxide, the mixture may be charged as a mixed gas. When the comonomer is a liquid material, the formaldehyde may be dissolved in the comonomer and the mixture charged as a solution of formaldehyde in the comonomer. In the event that formaldehyde is not sufficiently soluble in the liquid comonomer additional inert solvent may be added with the feed mixture. Or, if desired, separate streams of gaseous formaldehyde and liquid comonomer may be fed simultaneously to the reaction zone.

Upon completion of the formation of the prepolymer of a desired comonomer content the flow of comonomer is substantially reduced or shut off. The flow of formaldehyde is continued for the second stage of the polymerization reaction. The temperature of reaction during the second stage may be the same as the temperature during the first stage, or it may be a higher or lower temperature, if desired. It is preferred to carry out the second stage polymerization at a temperature above about 30° C. and preferably between about 50° C. and about 70° C. since second stage polymerization under these conditions produces a product with better distribution of comonomer units along the polymer chains. Although it is not desired to be bound by any particular theory of operation, it is believed that second stage polymerization at temperatures in the preferred range permits migration or redistribution of the comonomer units in the chain and thereby achieves better distribution thereof along the chain length.

Upon completion of the second stage reaction to the extent desired, the flow of formaldehyde is shut off and the reaction is terminated, preferably by the addition of a stoichiometric excess of an alkaline material such as tributylamine to neutralize the cationic catalyst.

Upon completion of the polymerization process the polymer is subjected to non-acidic hydrolysis step to degrade the unstable portion of the polymer and leave a stable residue as disclosed in U.S. patent application S.N. 102,097, filed Apr. 11, 1961 by Frank M. Berardinelli. The hydrolysis step is preferably carried out in an aqueous ammonia solution containing between about .01 and 1.0 wt. percent of ammonia at a temperature between about 130° C. and about 180° C. for a period between about 30 and about 300 seconds.

The residue from the polymer hydrolysis is generally blended with stabilizers against thermal degradation. The proportion of stabilizers incorporated depends upon the specific stabilizers or stabilizers used. A proportion between about 0.05 and 10 weight percent (based on the weight of polymer) has been found to be suitable for most stabilizers.

One suitable stabilizer system is a combination of (1) an anti-oxidant ingredient, such as phenolic anti-oxidant, and preferably a substituted bisphenol, and (2) an ingredient to inhibit chain scission, generally a compound of a polymer containing trivalent nitrogen atoms.

A suitable class of substituted bisphenols are the alkylene bisphenols including compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(4-methyl-6-tertiary butyl phenol) and 4,4'-butylidene bis-(6-tertiary butyl-3-methyl phenol). Suitable phenolic stabilizers other than alkylene bisphenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrolidone, hydrazides, compounds having 1 to 6 amide groups, proteins, compounds having tertiary amine and terminal amide groups, compounds having amidine groups, cycloaliphatic amine compounds and aliphatic acylureas. The stabilizers may be present in the melt hydrolysis step or they may be added to the hydrolized polymer after the melt hydrolysis step.

Copolymers prepared in accordance with this invention generally have $K_{D230}$ values after hydrolysis and after the addition of stabilizers which are not higher than about 0.2 wt. percent per minute. The $K_{D230}$ value is a measure of the rate of degradation of the polymer when maintained at a constant temperature of 230° C. The values are determined by weighing the polymer periodically while it is maintained in an oven heated to 230° C. in circulating air and determining successive weight differences in the polymer. $K_{D230}$ values are measured as weight percent degradation per minute.

Copolymers prepared in accordance with this invention generally have well distributed comonomer groups, as evidenced by anaylsis of the hydrolysis products. When ethylene oxide is the comonomer, hydrolysis residues show that at least one-third and usually more than one-half of the ethylene oxide is incorporated as single units, rather than as segments of two or more successive units.

Formaldehyde copolymers prepared in accordance with this invention may, after stabilization, be used for all of the purposes which the trioxane copolymers may be used, including molding, extrusion, and fiber formation.

Example I (7210–21)

This example is illustrative of the failure to produce formaldehyde copolymers containing low proportions of comonomeric units by passage of a mixed feed stream into the polymerization zone throughout the length of the polymerization reaction.

A mixture of 33 grams of formaldehyde and 1.94 grams of ethylene oxide was fed continuously over a period of one hour into a reaction vessel containing one liter of cyclohexane and 300 parts per million (based on total weight of formaldehyde) of boron trifluoride dibutyl etherate. The formaldehyde was generated during the one hour period by heating 50 grams of alpha-polyoxymetheylene at 160 to 180° C. and passing the vapors through two condensers maintained at −15° C. The ethylene oxide was commercial ethylene oxide fed from a tank through a safety trap and a flow meter. The temperature in the reaction zone was maintained at 25° C.

On completion of one hour of polymerization the catalyst was neutralized by the addition of 0.04 gram of tributylamine, the polymer was filtered, washed three times in acetone, and dried in a vacuum oven at 50° C. A sample of polymer was subjected to alkaline hydrolysis in a 10% solution of polymer in 50/50 dimethyl formamide/benzyl alcohol containing 1 gram of tributylamine per 100 grams of copolymer at 160° C. for ten minutes. The hydrolysis loss during this alkaline treatment was 85% of the original polymer. Hydrolysis losses of this magnitude are typical of oxymethylene homopolymers and it was concluded that copolymerization of formaldehyde and ethylene oxide had not taken place.

Examples II, III and IV (7210–50,41 and 7612–3)

The following examples illustrate the copolymerization of formaldehyde and ethylene oxide in accordance with the method of this invention at three different formaldehyde to ethylene oxide feed ratios during the initial copolymerization step.

In each of Examples II, III, and IV an ethylene oxide-formaldehyde gas stream having a fixed ratio of ethylene oxide to formaldehyde was fed to the reactor until the total amount of ethylene oxide desired in the copolymer had been added (2.2 to 6.8 minutes). The ethylene oxide was then cut off and the balance of the formaldehyde was added continuously for a total period of two hours. In each case the gases were led into a vessel containing 200 ml. of cyclohexane and .06 gram of boron trifluoride dibutyl etherate. The temperature in each case was maintained at 60° C. The formaldehyde was generated during the run by heating alphapolyoxymethylene at 170–175° C. and passing the vapor effluent through two traps maintained at −15° C. The ethylene oxide was added as a gas stream during the initial portion of each run for the time shown in the table below. After neutralization of the catalyst to stop the polymerization reaction and after recovery of the copolymer as described above in connection with Example I, the copolymer was subjected to hydrolysis conditions for determining hydrolysis loss. Specifically, a sample of copolymer was heated at 160° C. for one hour in a 10% solution of polymer in 50/50 dimethyl formamide/benzyl alcohol containing 1% tributylamine. The hydrolyzed polymer 2,2'-methylene bis (4-methyl-6-tertiary butyl phenol) was stabilized with 0.5% and 0.1% cyanoguanidine, as described above and tested for degradation rate at 230° C. The results are shown below.

|  | Example | | |
|---|---|---|---|
|  | II | III | IV |
| Formaldehyde (g.) | 61 | 61 | 54 |
| Ethylene Oxide (g.) | 1.65 | 1.65 | 1.65 |
| Feed Ratio Molar, CH$_2$O/Et Ox | 1:1 | 2:1 | 3:1 |
| Duration of Et Ox feed (min.) | 2.2 | 4.1 | 6.8 |
| Product Hydrolysis Loss (Percent) | 48 | 30 | 39 |
| Product K$_{D230}$ | 0.060 | 0.047 | 0.160 |
| Wt. Percent Et Ox | 0.6 | 1.1 | 1.2 |

Examples II to IV indicate that copolymers made in accordance with the method of this invention can incorporate relatively minor amounts of comonomeric units in the copolymer chain and that such copolymers are stable to hydrolysis and stable to thermal degradation at 230° C. A comparison of Examples II, III and IV also indicates that the optimum ratio of formaldehyde to ethylene oxide during the initial copolymerization step is about 2 mols of formaldehyde to 1 mol of ethylene oxide. The K$_{D230}$ value for Example III is about comparable to K$_{D230}$ values obtained for trioxane-ethylene oxide copolymers, such as those produced in accordance with the aforementioned patent of Walling et al.

The oxyethylene units of the copolymer product of Example III are well distributed as further evidenced by the fact that the hydrolyzed portion was found by gas chromatograph analysis to contain mono-, di-, and tri-ethylene oxide units in a ratio of 55:20:25.

It is to be understood that the foregoing detailed description is given merely by way of illustration and that many variations may be made therein without departing from the spirit of our invention.

The embodiments of the invention in which an exclusive property or privilege is claimed are defined as follows:

1. A method of producing a stable polymer having successively recurring oxymethylene groups interspersed with divalent comonomeric groups having adjacent carbon atoms which comprises passing a mixture of formaldehyde and a comonomer into a reaction zone in the presence of an inert liquid solvent and a cationic catalyst, said comonomer having adjacent carbon atoms and being capable of copolymerization with formaldehyde in the presence of said cationic catalyst and said mixture containing from about 0.5 to about 4 mols of formaldehyde per mol of comonomer, reacting said mixture in said reaction zone to produce a prepolymer containing substantially all the comonomer to be incorporated into the final polymer product and thereafter introducing additional formaldehyde sufficient to result in a total oxymethylene content in the final polymer product of at least about 85% by weight into said reaction zone and reacting said formaldehyde with said prepolymer to produce a polymer product of high molecular weight.

2. A method of producing a stable polymer having successively recurring oxymethylene groups interspersed with —OR— groups wherein R is a divalent radical containing at least two carbon atoms directly linked to each other and positioned in the polymer chain between the two valences, with any substituents on said R radical being inert, which method comprises passing a mixture of formaldehyde and a comonomer into a reaction zone in the presence of an inert liquid solvent and a cationic catalyst, said comonomer having adjacent carbon atoms and being capable of copolymerization with formaldehyde in the presence of said cationic catalyst and said mixture containing from about 0.5 to about 4 mols of formaldehyde per mol of comonomer, reacting said mixture in said reaction zone to produce a prepolymer containing substantially all the comonomer to be incorporated into the final polymer product and thereafter introducing additional formaldehyde sufficient to result in a total oxymethylene content in the final polymer product of at least about 85% by weight into said reaction zone and reacting said formaldehyde with said prepolymer and produce a polymer product of high molecular weight.

3. A method of producing a stable polymer having successively recurring oxymethylene groups interspersed with divalent comonomeric groups having adjacent carbon atoms which comprises passing a mixture of formaldehyde and an oxacyclic comonomer having adjacent carbon atoms into a reaction zone in the presence of an inert liquid solvent and a cationic catalyst, and said mixture containing from about 0.5 to about 4 mols of formaldehyde per mol of comonomer, reacting said mixture in said reaction zone to produce a prepolymer containing substantially all the comonomer to be incorporated into the final polymer product and thereafter introducing additional formaldehyde sufficient to result in a total oxymethylene content in the final polymer product of at least about 85% by weight into said reaction zone and reacting said formaldehyde with said prepolymer to produce a polymer product of high molecular weight.

4. A method of producing a stable polymer having successively recurring oxymethylene groups interspersed with divalent comonomeric groups having adjacent carbon atoms which comprises passing a mixture of formaldehyde and a cyclic ether comonomer having adjacent carbon atoms into a reaction zone in the presence of an inert liquid solvent and a cationic catalyst, said mixture containing from about 0.5 to about 4 mols of formaldehyde per mol of comonomer, reacting said mixture in said reaction zone to produce a prepolymer containing substantially all the comonomer to be incorporated into the final polymer product and thereafter introducing additional formaldehyde sufficient to result in a total oxymethylene content in the final polymer product of at least about 85% by weight into said reaction zone and reacting said formaldehyde with said prepolymer to produce a polymer product of high molecular weight.

5. A method of producing a stable polymer having successively recurring oxymethylene groups interspersed with divalent comonomeric groups having adjacent carbon atoms which comprises passing a mixture of formaldehyde and a comonomer into a reaction zone in the presenc of an inert liquid solvent and a cationic catalyst of the group consisting of boron trifluoride and organic complexes of boron trifluoride, said comonomer having adjacent carbon atoms and being capable of copolymerization with formaldehyde in the presence of said cationic catalyst and said mixture containing from about 0.5 to about 4 mols of formaldehyde per mol of comonomer, reacting said mixture in said reaction zone to produce a prepolymer containing substantially all the comonomer to be incorporated into the final polymer product and thereafter introducing additional formaldehyde sufficient to result in a total oxymethylene content in the final polymer product of at least about 85% by weight into said reaction zone and reacting said formaldehyde with said prepolymer to produce a polymer product of high molecular weight.

6. A method of producing a stable polymer having successively recurring oxymethylene groups interspersed with oxyethylene groups which comprises passing a mixture of formaldehyde and a comonomer of the group consisting of ethylene oxide and 1,3-dioxolane into a reaction zone in the presence of an inert liquid solvent and a cationic catalyst, said mixture containing from about 0.5 to about 4 mols of formaldehyde per mol of comonomer, reacting said mixture in said reaction zone to produce a prepolymer containing substantially all the comonomer to be incorporated in the final polymer product and thereafter introducing additional formaldehyde sufficient to result in a total oxymethylene content in the final polymer product of at least about 85% by weight into said reaction zone and reacting said formaldehyde with said prepolymer to produce a polymer product of high molecular weight.

7. A method of producing a stable polymer having successively recurring oxymethylene groups interspersed with oxyethylene groups which comprises passing a mixture of formaldehyde and a comonomer of the group consisting of ethylene oxide and 1,3-dioxolane into a reaction zone in the presence of an inert liquid solvent and a cationic catalyst, said mixture containing from about 0.5 to about 4 mols of formaldehyde per mol of comonomer, reacting said mixture in said reaction zone to produce a prepolymer containing substantially all the comonomer to be incorporated into the final polymer product in a reaction mixture and thereafter passing said reaction mixture to a second reaction zone and reacting said prepolymer with additional formaldehyde introduced into said second reaction zone to produce a polymer product of high molecular weight.

8. A method of producing a stable polymer having succesively recurring oxymethylene groups interspersed with oxyethylene groups having adjacent carbon atoms which comprises passing a mixture of formaldehyde and ethylene oxide into a reaction zone in the presence of an inert liquid solvent and a cationic catalyst of the group consisting of boron trifluoride and organic complexes of boron trifluoride, said mixture containing from about 0.5 to about 4 mols of formaldehyde per mol of ethylene oxide, reacting said mixture in said reaction zone to produce a prepolymer containing substantially all the comonomer to be incorporated into the final polymer product and thereafter introducing additional formaldehyde sufficient to result in a total oxymethylene content in the final polymer product of at least about 85% by weight into said reaction zone and reacting said formaldehyde with said prepolymer to produce a polymer product of high molecular weight.

9. The method of claim 8 wherein said mixture contains about two moles of formaldehyde per mol of ethylene oxide.

10. The method of claim 8 wherein said cationic catalyst is used in an amount between about 0.0025 and about 0.1 based on the weight of total monomer.

11. The method of claim 8 wherein said first reaction and said second reaction are carried out at temperatures between about 0° and about 100° C.

References Cited
UNITED STATES PATENTS

| | | | |
|---|---|---|---|
| 3,219,725 | 11/1965 | Kirkland | 260—823 |
| 3,256,246 | 6/1966 | Gutweiler | 260—823 |
| 3,027,352 | 3/1962 | Walling et al. | 260—67 |

FOREIGN PATENTS 807,589   1/1959   Great Britain.

MURRAY TILLMAN, *Primary Examiner.*

M. J. TULLY, E. B. WOODRUFF, *Assistant Examiners.*